May 19, 1970 A. M. NELSON 3,513,456

MAGNETO-OPTIC READOUT TRANSDUCER

Filed Feb. 13, 1961

INVENTOR:
Alfred M. Nelson
By Smyth, Roston & Pavitt
Attorneys

United States Patent Office 3,513,456
Patented May 19, 1970

3,513,456

MAGNETO-OPTIC READOUT TRANSDUCER

Alfred M. Nelson, Redondo Beach, Calif., assignor to The Magnavox Company, Torrance, Calif., a corporation of Delaware Filed Feb. 13, 1961, Ser. No. 88,833
Int. Cl. G11c *11/42;* G11b *11/10*
U.S. Cl. 340—174.1 13 Claims

ABSTRACT OF THE DISCLOSURE

Apparatus for magneto-optic readout of a moving magnetic record which employs a thin film magnetic element onto which the recorded information is transferred for subsequent magneto-optic readout.

This invention relates to apparatus for using optical techniques to determine magnetic information on a medium. More particularly, the invention relates to apparatus which transfers magnetic information from a medium to a thin film in contact with the medium and which uses optical techniques to determine the magnetic information transferred to the thin film. The invention also relates to apparatus in which the thin film is disposed on the periphery of an annular member and in which the annular member is rotated at a speed corresponding to the movement of the medium so as to obtain the direct transfer of information from the medium to the thin film without any relative motion between the medium and the thin film. The invention also relates to methods of accomplishing the features set forth above.

In digital computers, information representing complex numbers is indicated by a plurality of successive digits which are generally in binary form. In the binary representation, each digit has either a value of "0" or a value of "1." For example, a decimal value of "209" may be indicated in binary form by a plurality of successive signals recurring in a sequence of 011010001 where the least significant digit is at the right. Generally in the computers now in use the successive binary values of "1" or "0" are indicated in magnetic form where a signal of one polarity may indicate a binary "0" and a signal of opposite polarity may indicate a binary "1." The signals are recorded in magnetic form on a medium such as a tape by a magnetic head disposed in contiguous relationship to the tape and are retained in magnetic form on the tape until it is desired to reproduce the information. The tape is then moved past a magnetic head which may be the same head as previously used to record the information on the tape.

The use of magnetic heads in contiguous relationship to the tape presents certain serious difficulties. For example, since the head is in contiguous relationship to the tape, the tape tends to rub against the head as the tape moves past the head. This causes the magnetic information on the tape to become impaired and also causes the head to become clogged with the particles of magnetic material rubbed loose from the tape. It also requires the tape and the head to be replaced after some usage. Furthermore, the head experiences hysteresis and eddy current losses which limit the speed at which the tape can be moved past the head. This tends to limit the frequency at which the signals can be reproduced by the head, this limiting frequency being considerably less than the frequency at which the other circuits in the digital computer can operate properly. Another disadvantage results from the finite width of the head in a direction perpendicular to the direction of movement of the tape. This finite width prevents the magnetic information on the tape from being closely packed in the transverse direction so as to require an excessive amount of tape to be used in storing the magnetic information.

This invention provides apparatus and methods which overcome the above disadvantages. The apparatus is able to operate at frequencies considerably greater than the heads now in use and with a considerably increased density of information packing on the tape than is presently capable of being provided, the considerably increased density of information packing being in a direction transverse to the direction of movement of the tape. Furthermore, the apparatus operates to reproduce information from a magnetic medium such as a tape without producing any wear on the tape or on the reproducing apparatus. The apparatus and methods constituting this invention is adapted to be used in reproducing digital and analog information.

In the apparatus and methods constituting this invention, the magnetic information recorded on the medium such as the tape is transferred directly to a second medium such as a thin film as by disposing the tape in contiguous relationship to the film. In such an arrangement, the coercive force of the thin film preferably approaches, but does not equal, the coercive force of the tape. By having the coercive force of the thin film approach the coercive force of the tape, the problems of transferring information from the tape to the film by direct contact become somewhat increased but the information transferred to the thin film becomes retained with increased resolution than if the thin film had a low coercivity.

A light having a first particular direction of polarization is beamed at the thin film after the magnetic information has been transferred from the tape to the thin film. This polarized light is rotated by the thin film through a particular angle in accordance with the magnetic information transferred to the thin film. The light passing from the film is then polarized in a second direction transverse to the first direction so that only the component of light rotated by the thin film becomes detected. This component of light is converted to an electrical signal having characteristics corresponding to the detected component of light.

The rotation of the polarized light and the detection of such light rotation may be accomplished in either one of two alternative ways. As one alternative, the polarized light directed toward the surface of the thin film may be reflected by the thin film and may be detected after such reflection. The rotation of the light as a result of the reflection is known as the Kerr effect. As another alternative, the polarized light may be passed through the thin film and may be detected after passing through the thin film. The rotation of the light during the passage of the light through the film is known as the Faraday effect.

The thin film of magnetic material may be disposed on a suitable member such as the annular periphery of a cylinder. By rotating the cylinder in a particular direction and at a particular speed, similar movements of the tape and the thin film occur at the position at which the thin film contacts the tape. This prevents the tape from becoming worn during the movement of the tape past the thin film. In this way, the tape can be used indefinitely without experiencing any wear and without producing any deterioration in the operating characteristics of the magneto-optical head constituting this invention.

Figure 1:
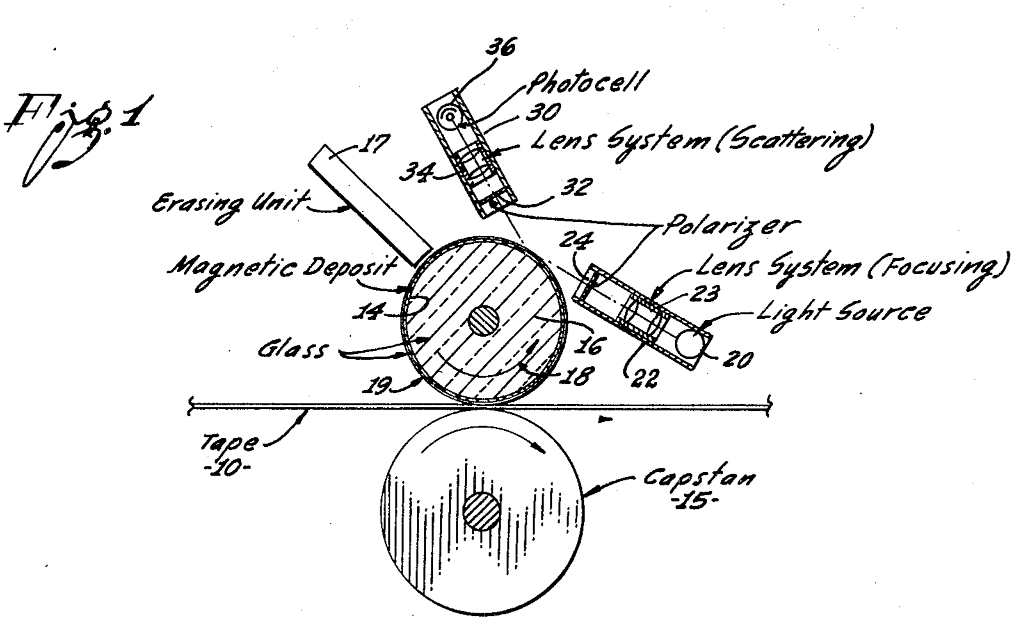
FIG. 1 is a somewhat schematic view of one embodiment of a magneto-optical head constituting this invention.

In the embodiment of the invention shown in FIG. 1, a magnetic medium such as a tape 10 may be constructed in a conventional manner such as by disposing particles of iron oxide on a thin sheet of cellulose acetate or on a material designated as "Mylar" by E. I. du Pont de Nemours. The tape 10 may be provided with properties to retain magnetic information on the tape and may be provided with a coercivity in the order of 300 to 600 oersteds. The information retained on the tape may be either digital or analog. For example, binary information may be recorded and retained on the tape such that a binary "0" is represented by a recording having one direction of magentization on the tape and a binary "1" is represented by a recording having an opposite direction of magnetization on the tape. The tape 10 is movable in a particular direction at a particular speed as indicated by an arrow 12.

A second medium is disposed in contacting relationship with the first medium on the side of the tape having the magnetic information, and a capstan 15 made from a resilient material such as rubber is pressed against the tape on the other side of the tape. The second medium may be formed by disposing a thin film 14 of magnetic material on a rigid movable backing member such as a cylinder 16. The film 14 may have a thickness in the order of 500 to 2000 angstrom units. The thin film 14 may be formed from any suitable material such as iron-cobalt or nickel-iron-copper compositions or may be formed from a material designated by the trade name of "Permalloy." The thin film 14 is provided with as high a coercivity as possible but the coercivity of the thin film should not exceed the coercivity of the magnetic coating on the tape 10. By way of illustration, the thin film 14 may have a coercivity in the order of 40 to 60 oersteds. The thin film 14 is formed with a smooth surface.

The cylinder 16 may be constructed from a suitable material such as glass, a suitable glass being designated by the trademark "Pyrex." The cylinder may be rotatable in a direction indicated by an arrow 18 when the tape is movable in the direction indicated by the arrow 18. The cylinder is movable at a speed to cause the portion pressing against the tape at each instant to have the same relative speed as the tape. Since the portion pressing against the tape at each instant has the same relative speed as the tape, no rubbing is produced against the tape or the thin film to produce a wear of the tape or the thin film.

The thin film 14 may be further protected by disposing a thin overlay 19 of glass or silicon monoxide or other suitable material on the thin film. The overlay 19 is provided with properties to present a hard and smooth surface to the tape 10 and to prevent corrosion of the thin film. The overlay 19 may be provided with a suitable thickness such as 1000 angstroms such that it does not interfere with the transfer of magnetic information between the tape and the thin film.

As the thin film 14 moves into contiguous relationship to the tape 10, the magnetic information on the tape becomes directly transferred to the thin film. As the term "directly" is used in the specification and in the claims, the transfer of magnetic information is obtained without the aid of any additional means such as induction coils. The thin film then rotates to a position where the magnetic information on the film can be optically read. After the magnetic information has been optically read on each position on the film, the thin film becomes satuarated with magnetic flux of a particular polarity to prepare the film for the recording of further information on the film when the film contacts the tape. This is accomplished by a head 17 which is preferably disposed at least 180° along the annular periphery of the thin film 14 from the position at which the thin film 14 contacts the tape 10.

A light source 20 is disposed on one side of the thin film 14 and is constructed to provide a thin spot of light. The light source 20 is disposed within a cylindrical tube 22 at the outer end of the tube. The light from the source 20 is collimated as at 23 and is thereafter directed toward a polarizer 24 which is also disposed within the tube 22 at a position closer to the thin film than the source 20. The polarizer 24 may be constructed in a conventional manner to prevent the light along a first particular axis such as a vertical axis from passing through the polarizer.

In the embodiment shown in FIG. 1, the tube 22 is disposed at a particular angle such as an angle of 30° to the annular periphery of the thin film 14. The light passing through the tube 22 is directed toward the thin film 14 at a position between the head 17 and the position of contact between the tape 10 and the thin film 14. In this way, the polarized light passing through the tube 22 is reflected by the thin film toward a tube 30. The polarized light becomes rotated through a relatively small angle such as approximately 0.1° when it is reflected by the thin film 14. This rotation of the polarized light upon the reflection of the light by the thin film 14 is known as the Kerr effect. The direction of rotation of the light is dependent upon the magnetic polarization of the thin film at each successive position on the film. The angle of the light rotation is dependent upon the intensity of the magnetic information being tested by the light from the source 20 at each instant. The rotation of the light may result from the penetration of the light into the film before the light becomes reflected.

The tube 30 is preferably disposed at the same angle to the periphery of the thin film 14 as the tube 22 but is disposed on the opposite side of a radial line extending from the center of the cylinder 16 to a position between the tube 30 and the tube 22. A polarizer 32 corresponding to the polarizer 24 is disposed within the tube 30 to polarize the light reflected from the thin film 14. The polarizer 32 is disposed to prevent light from passing along a second particular axis transverse to the first particular axis. For example, the polarizer 32 may be constructed and disposed to prevent light along a horizontal axis from passing when the polarizer 24 is constructed and disposed to prevent light along a vertical axis from passing. Because of the transverse relationship between the polarizers 24 and 32, only the component of the light rotated upon the reflection of the light from magnetized localities of the thin film is able to pass through the polarizer 32. This component of light has actually been viewed in a pattern of binary bits corresponding exactly to the pattern of binary bits previously recorded on the tape 10. The pattern of binary bits is indicated by opposite patterns of light and dark areas, one pattern of light and dark areas representing a binary value such as "0" and the opposite pattern of light and dark areas representing a binary value such as "1."

The light passing through the polarizer 32 is directed to a lens system 34 which operates to spread the light from a thin spot so as to cover an extended area. The light from the lens system 34 is then directed to a photomultiplier tube 36 which operates to produce electrical signals having amplitude characteristics corresponding to the intensity of the light passing to the photomultiplier tube. The signals produced by the photomultiplier tube 36 are used to control the operation of successive stages such as in a digital computer.

The apparatus disclosed above has certain important advantages. It transfers magnetic information directly from the tape 10 to the thin film 14 without producing any wearing action on the tape or on the thin film. Because of this, the tape 10 can be used indefinitely rather than only a limited number of times as in the systems commercially now in use and particularly the systems using the rotating head.

Since the magnetic information on the tape 10 becomes directly transferred to the thin film 14 and then becomes detected by optical principles, no hysteresis or eddy current losses occur to present problems. Because of this, the frequency of reading signals from the thin film 14 becomes considerably increased relative to the frequency at which the magnetic heads now in use can reproduce information. For example, frequencies in the range of megacycles per second and even in the range of tens and hundreds of megacycles per second are either capable of being attained or are in the realm of attainment.

Another advantage results from the density with which the magnetic information can be packed on the tape 10, especially in the direction transverse to the direction of movement of the tape. This advantage is obtained in part because of the sharp delineation and the extreme thinness of the light from the source 20. It is also obtained in part because the magnetic information is converted to optical information so that a magnetic head having a closed magnetic loop is not required. This closed magnetic loop occupies a relatively great distance in the direction transverse to the direction of movement of the tape so as to decrease the density of packing in this direction. The distance occupied by the heads now in use is especially great because of the tracking problem in read-back and because of the finite number of laminations of magnetic material required in such heads to obtain a proper operation of the heads in reading magnetic information.

Still another advantage of the apparatus constituting this invention results from the elimination of any gaps as in the heads now in use. Such gaps are necessary in the heads now in use to provide a path for the flux from the magnetic medium such as the tape so that the magnetic information on the tape can be read by the head. Because of this, heads now in use have to be properly positioned relative to the magnetic information on the tape since any deviation of the gap in the heads from the magnetic information on the tape causes a considerable reduction in the strength of the signals induced in the heads.

The need for any gap is eliminated in the apparatus constituting this invention by obtaining a transfer of the magnetic information on the tape directly to the thin film 14 and by using optical techniques to read the magnetic information on the thin film 14. In this way, the apparatus constituting this invention considerably reduces any problems of tracking the magnetic information on the tape such as in the heads now in use.

The apparatus constituting this invention has other important advantages. Since the tape 10 can last indefinitely and the information on the tape does not become impaired even with repeated use of the tape, the tape can be used to store information such as a plurality of different addresses and commands for use in a computer. The tape can then be shifted to the particular address or command desired at any instant and the particular address or command can then be transferred to the thin film 14. In this way, the thin film can serve as a buffer or as a computer memory to eliminate a considerable number of stages which are required in the computers now in use.

It will be appreciated that the apparatus constituting this invention can be used equally well with analogue information recorded on the tape 10 as with digital information recorded on the tape. For example, the apparatus constituting this invention can be used to reproduce video signals which may be recorded on the tape 10. The apparatus can be especially used to reproduce video information when the video information is converted to frequency modulations. The reason is that such frequency modulations represent the video information by the change in the time required to produce transitions from one polarity of signals to another. Every time that such a transition occurs, the apparatus constituting this invention detects the transition and produces a corresponding electrical signal.

Figures 2, 3, 4:
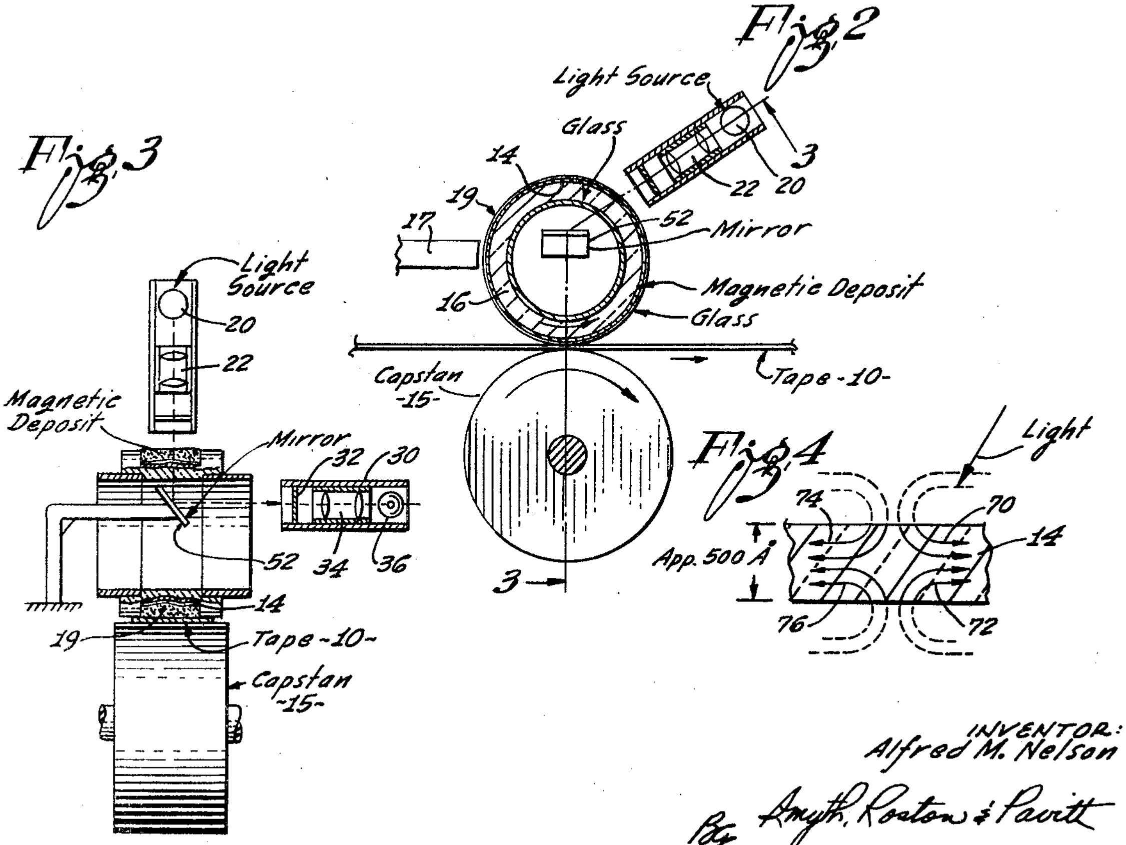
FIG. 2 is a somewhat schematic view, similar to that shown in FIG. 1, of a second embodiment of the invention.
FIG. 3 is a sectional view substantially on the line 3—3 of FIG. 2.
FIG. 4 is an enlarged fragmentary schematic diagram of the magneto-optical head shown in FIGS. 2 and 3 and illustrates the principles of operation of the embodiment shown in FIGS. 2 and 3.

In the embodiment of the invention shown in FIGS. 2, 3 and 4, the tube 22 is disposed so that the polarized light from the source 20 is directed toward the thin film 14 and is able to pass through the film. However, the light becomes rotated during its passage through the film in a direction depending upon the polarity of the magnetic information recorded on the film and through an angle dependent upon the intensity of the magnetic recording on the film. The angle of rotation of the light is also dependent upon the thickness of the film and the particular material constituting the film. The rotation of the light during the passage of the light through the film is known as the Faraday effect.

The light passing through the thin film 14 also passes through the cylinder 16 since the cylinder is made from glass. The center of the cylinder 16 is hollow and a mirror 52 is disposed within the cylinder. The mirror is disposed to reflect the light toward the tube 30. The light then passes through the polarizer 32 and the lens system 34 and produces a signal in the phototube 36 in accordance with the rotation provided in the light as the light passes through the thin film 14.

Although the light may be directed along a line radial to the thin film, in order to pass through the thin film, the light is preferably directed at an oblique angle to the radial line as shown in FIGS. 2, 3 and 4. The light is directed at such an oblique angle in order to enhance the response of the embodiment shown in FIGS. 2, 3 and 4. This may be seen by comparing the response of the embodiment shown in FIGS. 2, 3 and 4 when the light is directed along a radial line and when the light is directed along a line oblique to the radial line.

As will be seen from FIG. 4, the flux produced in the thin film 14 travels in paths indicated at 70 and 72 for one direction of magnetic polarization and travels in paths indicated at 74 and 76 for a second direction of magnetic polarization. The paths 70 and 72 have the same tangential direction along the film but opposite radial directions, as do the paths 74 and 76. However, the paths 74 and 76 have tangential directions opposite to those of the paths 70 and 72.

When the light travels in a radial direction, the radial portion of the flux paths 70 and 74 tend to produce a rotation of the light in directions opposite to the rotation produced by the radial positions of the flux paths 72 and 76. This causes the light passing to the mirror 52 to have a zero rotation for the radial component of the light so that no output signal is produced.

By directing the light at an oblique angle as shown in FIG. 4, the light is provided with a tangential component. This tangential component is subjected to rotations in the same direction by light having the flux path 70 and light having the flux path 72. The tangential component is also subjected to rotations in the opposite direction by light having the flux paths 74 and 76. Because of this, the light passing to the mirror 52 is rotated in a direction dependent upon the polarization of the magnetizations on the thin film 14. This rotation of the light is detected to produce an output signal.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for use with a medium having magnetic information recorded on the medium and movable in a first direction, a rigid cylindrical member having a thin film of magnetizable material disposed on the member in contiguous relationship with the medium, the member being movable in the first direction at the same speed as the medium to obtain a direct transfer of the magnetic information from the medium to the thin film, means disposed relative to the thin film for directing light with a particular polarization toward the thin film at an angle relative to the thin film to obtain a reflection of light from the thin film with a rotation from the particular polarization dependent upon the transfer of the magnetic information to the thin film, and means disposed relative to the thin film to determine the rotation of the light reflected from the thin film for an indication of the magnetic information on the medium.

2. In combination for use with a medium having magnetic information recorded on the medium and movable in a first direction, a rigid cylinder disposed in contiguous relationship with the first medium at a particular position and rotatable in a direction and at a speed to produce the same relative movement of the medium and the cylinder at the particular position and to dispose successive annular positions on the annular member in contiguous relationship to the medium on a cyclic basis, a thin film of magnetic material on the periphery of the cylinder to obtain a direct transfer of the magnetic information from the medium to the thin film, means disposed relative to the thin film on the cylinder for directing light of a particular polarization at the thin film for rotation of such polarized light in accordance with the magnetic information transferred to the thin film, and means disposed relative to the thin film on the cylinder for determining the rotation of the light passing from the film to provide an indication of the magnetic information transferred to the thin film.

3. In combination for use with a first medium having magnetic information recorded on the medium and movable in a first direction at a particular speed, a member disposed in contiguous relationship with the first medium and movable in a closed loop in the first direction to provide a movement of the member at the particular speed and to dispose successive positions on the member in contiguous relationship to the first medium on a cyclic basis, a thin magnetic film disposed on the annular member to receive the magnetic information from the first medium at the successive positions contacting the first medium, first means disposed relative to the thin magnetic film for directing light in a particular polarization at the thin film for the passage of light from the film in accordance with the magnetic information transferred to the film at the successive positions on the film, and second means disposed relative to the thin magnetic film for receiving the light passing from the film and for producing electrical signals in accordance with the directional characteristics of the light passing from the film.

4. In the combination set forth in claim 3, the member contiguous with the first medium being rigid and cylindrical and the thin magnetic film being disposed to receive the magnetic information directly from the first medium at the successive positions contacting the first medium.

5. In combination for use with a first medium having magnetic information recorded on the medium and movable in a first direction at a particular speed, a second medium disposed in contiguous relationship with the first medium and movable in a closed loop in the first direction at the particular speed to obtain a transfer from the first medium to the second medium on a cyclic basis of the magnetic information at successive positions in the first direction on the first medium, first means disposed relative to the second medium for directing light at the second medium to obtain a passage of light from the second medium in accordance with the magnetic information transferred to the second medium, and second means disposed relative to the second medium for obtaining the production of electrical signals in accordance with the characteristics of the light passing from the second medium.

6. In the combination set forth in claim 5, the second medium being rigid and cylindrical and being provided with a coercive force less than, but approaching, the coercive force of the first medium to obtain a direct transfer of magnetic information from the first medium to the second medium.

7. The combination set forth in claim 6 in which the first means are disposed relative to the second medium to obtain a reflection of the light from the medium and in which the second means are disposed to receive the light reflected from the second medium.

8. A method of reproducing magnetic information on a movable medium, including the steps of: disposing a thin magnetic film in contact with the medium, producing a movement of the film at the same speed and in the same direction as the movement of the medium to obtain a direct transfer to the thin film of magnetic information at successive positions on the medium, polarizing light in a first particular direction, directing the polarized light at the thin film for rotation of the light in accordance with the magnetic information transferred to the thin film, polarizing the light passing from the thin film in a second direction transverse to the first direction, and detecting the light polarized in the second direction.

9. The method set forth in claim 8 in which the light polarized in the first direction is directed at the thin film to obtain a reflection of the light from the thin film and in which the light reflected from the thin film is polarized in the second direction.

10. The method set forth in claim 8 in which the light polarized in the first direction is directed at the thin film to obtain a passage of the light through the thin film and in which the light passing through the thin film is polarized in the second direction.

11. Apparatus for reproducing information represented as a magnetic pattern on a magnetic tape, comprising a rotatably mounted transparent tubular member, a very thin, circumferential band of ferromagnetic material on the outer surface of said member, said ferromagnetic material having a coercive force of substantially lower value than that of the ferromagnetic material of the tape, said film being disposed so that the tape is pressed into magnetically coupled intimate contact therewith to transfer to the film the magnetic pattern corresponding to that on the tape and whereby the member is rotated by the movement of said tape, a plane polarized light beam source disposed so as to direct a polarized light beam through the supporting member and the film at a point spaced from the area of contact between said tape and said film, the thickness of the film being such as to transmit said beam, and means disposed in the path of the transmitted light beam for determining the rotation of the polarized light beam as affected by the magnetic pattern on the film and thereby the amplitude and direction of magnetization in the recorded pattern on the magnetic tape.

12. Apparatus for reproducing information represented as a magnetic pattern on a movable magnetic tape, comprising a transparent rotatably mounted tubular member having a highly polished outer surface, a thin circumferential film of ferromagnetic material on said surface, said ferromagnetic material having a substantially lower coercive force than that of the ferromagnetic material of said tape, said film being disposed so that the tape is pressed into intimate contact therewith to transfer to the film the magnetic pattern corresponding to that on the tape and whereby the member is rotated by the movement of said tape, a plane polarized light beam source disposed so as to direct a polarized light beam through the member toward the surface of said film and at such an angle thereto that the polarized light beam is affected by the film and in particular the magnetic pattern thereon, and means disposed in the path of the affected light beam for determining the rotation of the same and thereby the amplitude and direction of magnetization in the recorded pattern on the magnetic tape.

13. Apparatus for reproducing information represented as a magnetic pattern on a magnetic tape, comprising a rotatably mounted cylindrical member having a highly polished outer surface, a thin circumferential band of ferromagnetic material on the outer surface of said member, said ferromagnetic material having a substantially lower coercive force than that of the ferromagnetic material of said tape, said film being disposed so that the tape is pressed into magnetically coupled intimate contact therewith to transfer to the film the magnetic pattern corresponding to that on the tape and whereby the member is rotated by the movement of said tape, a plane polarized light beam source disposed to direct a polarized light beam at the film at a point spaced from the area of contact between said tape and said film and at such an angle to said film that the polarized light beam is responsive to the magnetic pattern transferred to said film, and means disposed in the path of the responsive light beam for determining the rotation of the plane of polarization thereof and thereby the amplitude and direction of magnetization in the recorded pattern on the magnetic tape.

References Cited

UNITED STATES PATENTS

| | | | |
|---|---|---|---|
| 2,686,229 | 8/1954 | Blaney | 179—100.2 |
| 2,747,026 | 5/1956 | Camras | 179—100.2 |
| 2,890,288 | 6/1959 | Newman | 179—100.2 |
| 2,984,825 | 5/1961 | Fuller et al. | 340—174.1 |
| 2,768,049 | 10/1959 | Geiser | 179—100.2 |

OTHER REFERENCES

Publication I: "Magnetic Domains by the Longitudinal Kerr Effect" by C. A. Fowler, Jr. and E. M. Fryer—Physical Review, vol. 94, pp. 52–56, Apr. 1, 1954.

Publication II: "Magnetic-Optic Hysteresigraph," IBM Technical Disclosure Bulletin—vol. 1, No. 5, February 1959, pp. 18 and 19.

Publication III: "Magnetic Domains in Thin Film by the Faraday Effect" by C. A. Fowler, Jr. and E. M. Fryer—Physical Review, vol. 104, Oct. 15, 1956, pp. 552–553.

TERRELL W. FEARS, Primary Examiner

U.S. Cl. X.R.

179—100.2; 346—74; 350—151